United States Patent
Nash et al.

(10) Patent No.: US 10,824,581 B2
(45) Date of Patent: Nov. 3, 2020

(54) PERIPHERAL COMPONENT INTERCONNECT EXPRESS (PCIE) DEVICE ENUMERATION VIA A PCIE SWITCH

(71) Applicant: Western Digital Technologies, Inc., San Jose, CA (US)

(72) Inventors: Berck Nash, Divide, CO (US); Randall Hess, Colorado Springs, CO (US); Michael Walker, Colorado Springs, CO (US); James Michael Reiser, Colorado Springs, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 351 days.

(21) Appl. No.: 15/634,396

(22) Filed: Jun. 27, 2017

(65) Prior Publication Data
US 2018/0373669 A1 Dec. 27, 2018

(51) Int. Cl.
*G06F 3/06* (2006.01)
*G06F 3/12* (2006.01)
*G06F 13/42* (2006.01)
*G06F 13/40* (2006.01)

(52) U.S. Cl.
CPC ...... *G06F 13/4282* (2013.01); *G06F 13/4022* (2013.01); *G06F 13/4295* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 2004/0205279 A1* | 10/2004 | Ohnishi | G06F 13/385 710/305 |
| 2005/0060481 A1* | 3/2005 | Belonoznik | G06F 13/385 710/315 |
| 2005/0076324 A1* | 4/2005 | Lowell | G06F 9/45558 717/100 |
| 2013/0024595 A1 | 1/2013 | Subramaniyan et al. | |
| 2016/0162436 A1* | 6/2016 | Raghavan | G06F 13/28 710/308 |
| 2016/0328344 A1* | 11/2016 | Jose | G06F 13/4022 |
| 2017/0097910 A1* | 4/2017 | Kumar A V | G06F 13/28 |
| 2018/0276161 A1* | 9/2018 | Ahn | G06F 13/404 |
| 2019/0079887 A1* | 3/2019 | Itkin | H04L 69/162 |

FOREIGN PATENT DOCUMENTS

EP  2257880 A2  12/2010

* cited by examiner

*Primary Examiner* — Hyun Nam (57) ABSTRACT

Described herein are enhancements for managing multi-host Peripheral Component Interconnect Express (PCIe) switching. In one implementation, a PCIe switch coupled to a host processing system and PCIe slots may receive enumeration requests from the host processing system to identify available PCIe devices. In response to the enumeration requests, the PCIe switch may transfer responses to the host processing system indicating device identifier information for PCIe devices associated with the PCIe slots even if one or more of the PCIe devices is not currently installed.

21 Claims, 6 Drawing Sheets

PERIPHERAL COMPONENT INTERCONNECT EXPRESS (PCIE) DEVICE ENUMERATION VIA A PCIE SWITCH

BACKGROUND

Peripheral Component Interconnect Express (PCIe) is a high-speed serial computer expansion bus standard that is used to communicate between a host processing system and an expansion device. These expansion devices may comprise networking devices, storage devices, graphics processing devices, among other possible devices. To provide the communications, packets are transferred to and from the host processing system to provide the desired functionality. For example, when data is requested from a PCIe storage device, one or more packets are transferred to the host computing system over the PCIe lanes to the host processing system.

In some implementations, a user of a particular computing system may desire to quickly add, remove, or replace PCIe devices from the system. For example, if additional storage were required on the computing system, a user may decide to add a new PCIe data storage device to the system. Traditionally, this requires the user to shut down the system before adding the PCIe device to the system. This may cause undesirable downtime for the system, and limit the opportunities that the user might have to update PCIe devices of the computing system. Additionally, while the Peripheral Component Interconnect (PCI) standard does provide support for "hot swap" operations with end devices, the standard is cumbersome and poorly supported via hardware and software on current computing systems.

OVERVIEW

Examples disclosed herein provide enhancements for managing configurations of Peripheral Component Interconnect Express (PCIe) devices to a host processing system. In one implementation, a PCIe switch is configured to receive PCIe enumeration requests from the host processing system to identify available PCIe devices. In response to the PCIe enumeration requests, for each PCIe slot in the plurality of PCIe slots coupled to the PCIe switch, the PCIe switch transfers a response to the host processing system indicating device identifier information for a PCIe device associated with the PCIe slot even if no PCIe device is installed in the slot.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only to the claims and their equivalents.

DETAILED DESCRIPTION

Figure 1:
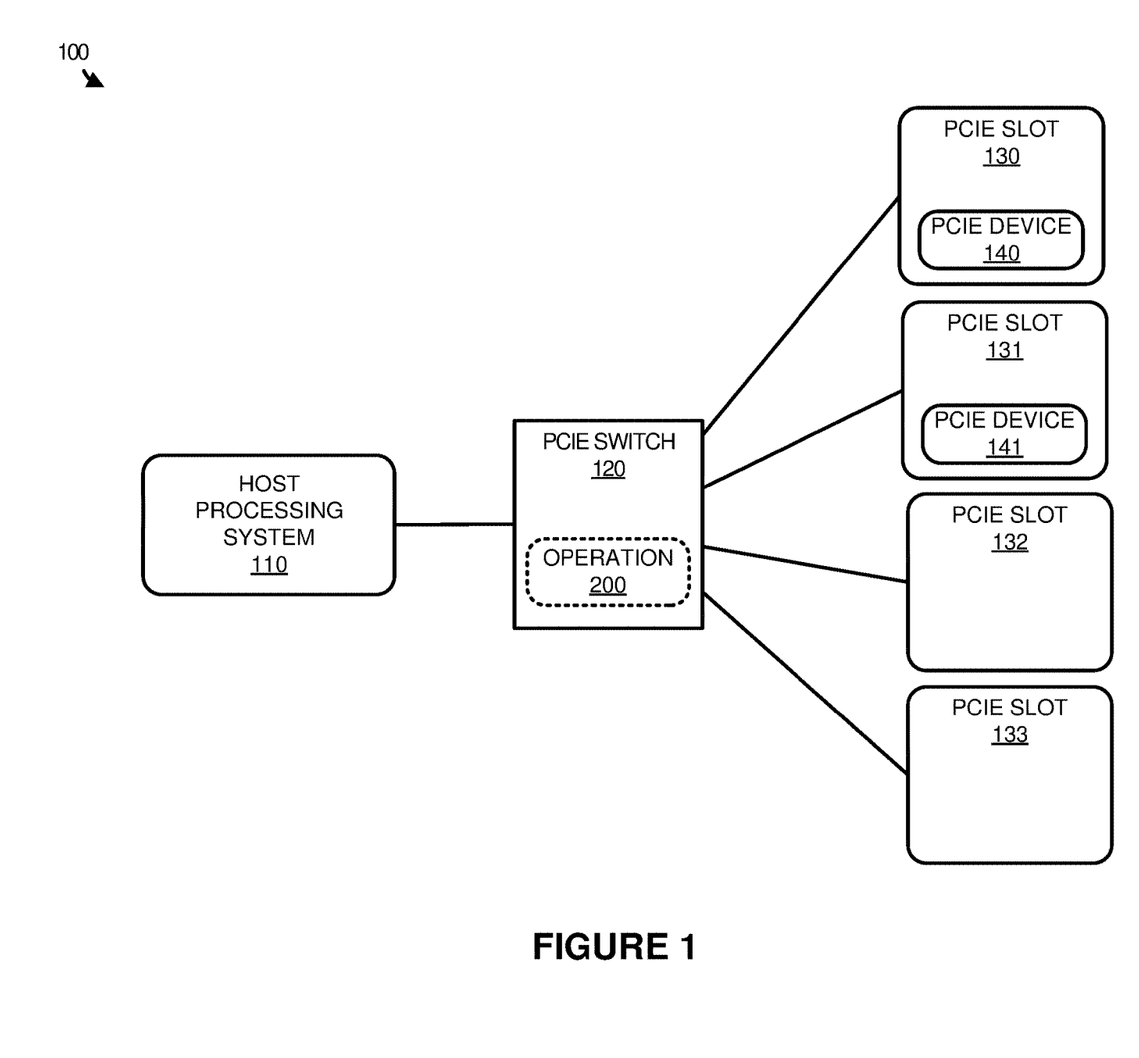
FIG. 1 illustrates a computing system to manage Peripheral Component Interconnect Express (PCIe) device configuration for a host processing system according to an implementation.

FIG. 1 illustrates a computing system 100 to manage Peripheral Component Interconnect Express (PCIe) device configuration for a host processing system according to an implementation. Computing system 100 includes host processing system 110, PCIe switch 120, PCIe slots 130-133, PCIe devices 140-141. PCIe devices 140-141 may comprise data storage devices, graphical processing units, network interface cards, or some other similar PCIe device. Although demonstrated in the examples that follow using PCIe interconnects, it should be understood that similar operations may be implemented using other interconnects, such as Peripheral Component Interconnect (PCI), or some other interconnect that uses enumeration communications from a host to identify and configure end devices.

In operation, PCIe switch 120 provides connectivity between host processing system 110 and PCIe devices made available via PCIe slots 130-133. To provide the connectivity with the PCIe slots, host processing system 110, which may comprise a central processing unit (CPU) in some examples, must implement an enumeration process to identify and configure the PCIe devices available in the PCIe slots. This enumeration process may identify vendor information for each device, a device identifier for each device, or any other similar information about the device. Once identified, host processing system 110 may allocate addressing configurations required by the device for communication with the host processing system. After configuration, host processing system 110 may exchange communications with any of the available PCIe devices via PCIe switch 120.

Figure 2:
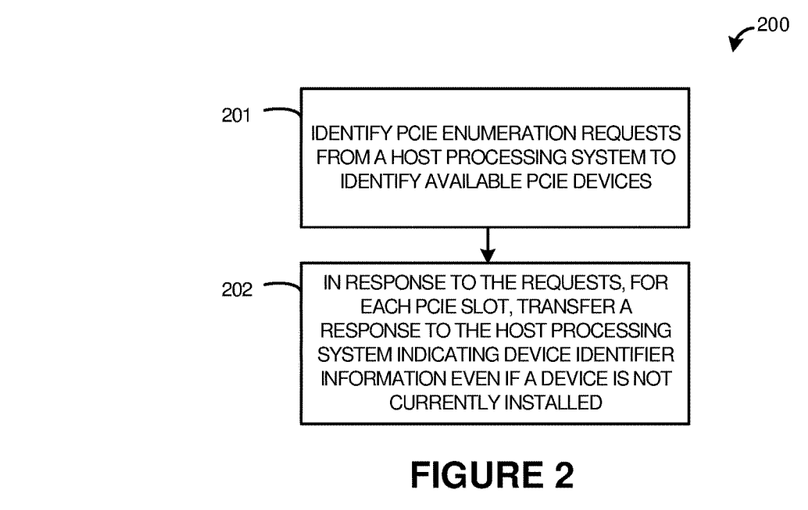
FIG. 2 illustrates an operation of a PCIe switch to provide PCIe device enumeration according to an implementation.

In the present implementation, to identify the device identifier information for the PCIe devices, PCIe switch 120 is configured with operation 200 to provide information to host processing system 110. In particular, rather than relying on the PCIe devices to provide information about their configuration, PCIe switch 120 is used to identify enumeration requests from host processing system 110 and provide device identifier information to the host processing system 110 even if no device is installed in a PCIe slot. For example, although no device is currently installed in PCIe slot 132, PCIe switch 120 may provide device identifier information for a device that is associated with the slot. This may permit PCIe switch 120 to be configured to anticipate devices that will be installed for computing system 100. Thus, if PCIe slot 132 is designed to support a PCIe storage device, then PCIe switch 120 may provide device identifier information for the storage device to host processing system 110 to ensure that memory addresses are allocated to the device although the device is not yet installed.

To further demonstrate the operations of PCIe switch 120 of computing system 100, FIG. 2 is provided. FIG. 2 illustrates an operation 200 of a PCIe switch to provide PCIe device enumeration according to an implementation. The processes of FIG. 2 are referenced parenthetically in the paragraphs that follow with reference to elements of computing system 100 of FIG. 1.

As described previously, when host processing system 110 is initiated, host processing system 110 may start an enumeration process to identify and configure PCIe devices for various operations. Here, PCIe switch 120 identifies (201) PCIe enumeration requests from a host processing system to identify available PCIe devices. In particular, host processing system 110 may transfer one or more enumeration requests to determine device identifier information for any PCIe device available to the host processing system via PCIe lanes. In response to the requests and for each PCIe slot, PCIe switch 120 transfers (202) a response to the host processing system indicating device identifier information even if a device is not currently installed in the PCIe slot.

Referring to an example in computing system 100, when a first enumeration request is received that corresponds to PCIe slot 130, PCIe switch 120 may be responsible for providing device identifier information for PCIe device 140. As a result, in some implementations, rather than relying on the PCIe device itself to provide device information, the PCIe switch may be used to provide the required information. Similarly, although a device is not installed in PCIe slot 132, when an enumeration request is received that corresponds to the slot, PCIe switch 120 may respond to the request with device identifier information for a device that is expected to be installed in the PCIe slot. This permits host processing system 110 to allocate addressing resources for the device, although the device is not currently installed. Consequently, when a user does install the device in the PCIe slot, host processing system 110 may have already allocated addressing resources to communicate with the device.

In some implementations, in the response from PCIe switch 120, the response may provide an indication of whether a device is physically installed in the corresponding PCIe slot. This indication may be used by a driver or other process on host processing system 110 to determine whether or not to make the device available for use by applications and processes on host processing system 110. For example, if an indication were provided by PCIe switch 120 that indicated a PCIe storage device was allocated to PCIe slot 132, but the device was not currently installed, the driver may be used to reserve the appropriate addressing space for the device, but not make the device available for use by the applications and processes on host processing system 110. However, once the device is installed in PCIe slot 132, then PCIe switch 120 may provide a second notification to host processing system 110 indicating that the device is available for use. As a result, the driver on host processing system 110 may provide the device for use by processes and applications of host processing system 110.

In some examples, once PCIe switch 120 provides device identifier information to host processing system 110, host processing system 110 may attempt to write to and configure the PCIe device. In this instance, PCIe switch 120 may cache the configuration writes locally and, if the device is installed, forward the configuration write to the corresponding PCIe device. If, however, a device is not installed at the time of the configuration write, PCIe switch 120 may maintain the write and forward the configuration write when the device is made available within the corresponding PCIe slot. As a result, even if the device is not installed when the configuration writes are provided from the host processing system, PCIe switch 120 may forward the writes when the device is made available.

Figure 3:
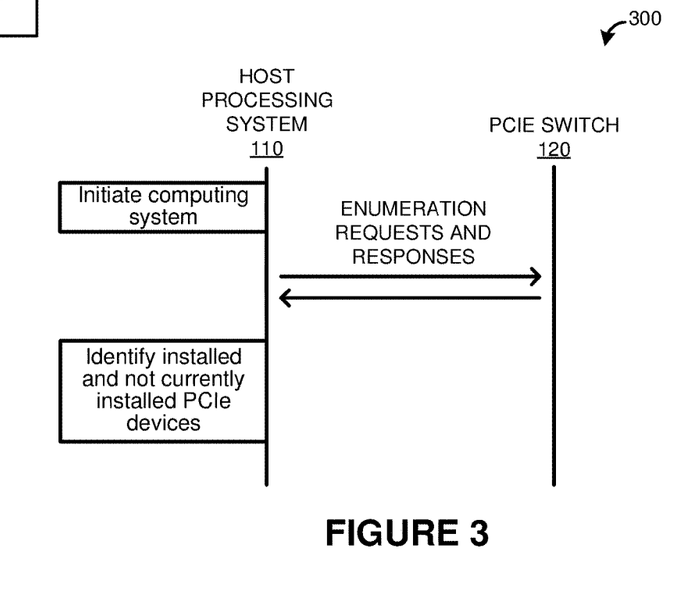
FIG. 3 illustrates a timing diagram of initiating PCIe device enumeration according to an implementation.

FIG. 3 illustrates a timing diagram 300 of initiating PCIe device enumeration according to an implementation. The operations of timing diagram 300 are demonstrated with the use of host processing system 110 and PCIe switch 120 of computing system 100.

As depicted, when host processing system 110 is initiated for computing system 100, host processing system 110 may transfer enumeration requests to identify available PCIe devices within the computing system. Here, rather than receiving information about the devices from the devices themselves, PCIe switch 120 is used to identify the enumeration requests, and in response to the requests, transfer responses indicating device information for each PCIe slot coupled to PCIe switch 120 via PCIe lanes. Referring to the example of FIG. 1, this device information may include a vendor identifier and a device identifier for each PCIe device of PCIe devices 140-141, and may further include a vendor identifier and device identifier for PCIe devices that are to be installed in PCIe slots 132-133.

For example, PCIe slots 130-133 may be configured to support a particular PCIe storage device, wherein the device may be associated with a vendor identifier and a device identifier. As a result, PCIe switch 120 may be configured to ensure that addressing is made available for PCIe storage devices even though the devices are not installed. Consequently, when host processing system 110 attempts to read device information from the PCIe devices located in PCIe devices slots 132-133, rather than presenting that no device is present, PCIe switch 120 may be used to indicate information for devices that can be installed in the slot, preserving PCIe addressing for the devices.

In some implementations, in the responses from PCIe switch 120 to the enumeration requests, PCIe switch 120 may provide indications of which PCIe slots have a PCIe device installed and which PCIe slots do not have a device currently installed. This permits a driver operation on the host to ensure that applications and processes executing on host processing system 110 do not attempt to communicate with PCIe devices that are not physically available. Referring to the PCIe storage device example, the driver of host processing system 110 may ensure that addressing is made available to future storage devices of PCIe slots 132-133, however, the driver may also ensure that data communications are not attempted by any processes or applications executing on the host. In some examples, to ensure that the applications do not attempt to communicate with the unavailable PCIe device, the driver may be used to ensure that the device remains in a pending state. Thus, rather than making the device ready for operation with the applications, the device may be held in a pending state until the device is made available in the PCIe slot. Once made available, PCIe switch 120 may provide an indication that the device has been made available, and the driver may present the device as available to the applications and processes executing on the host.

Figure 4:
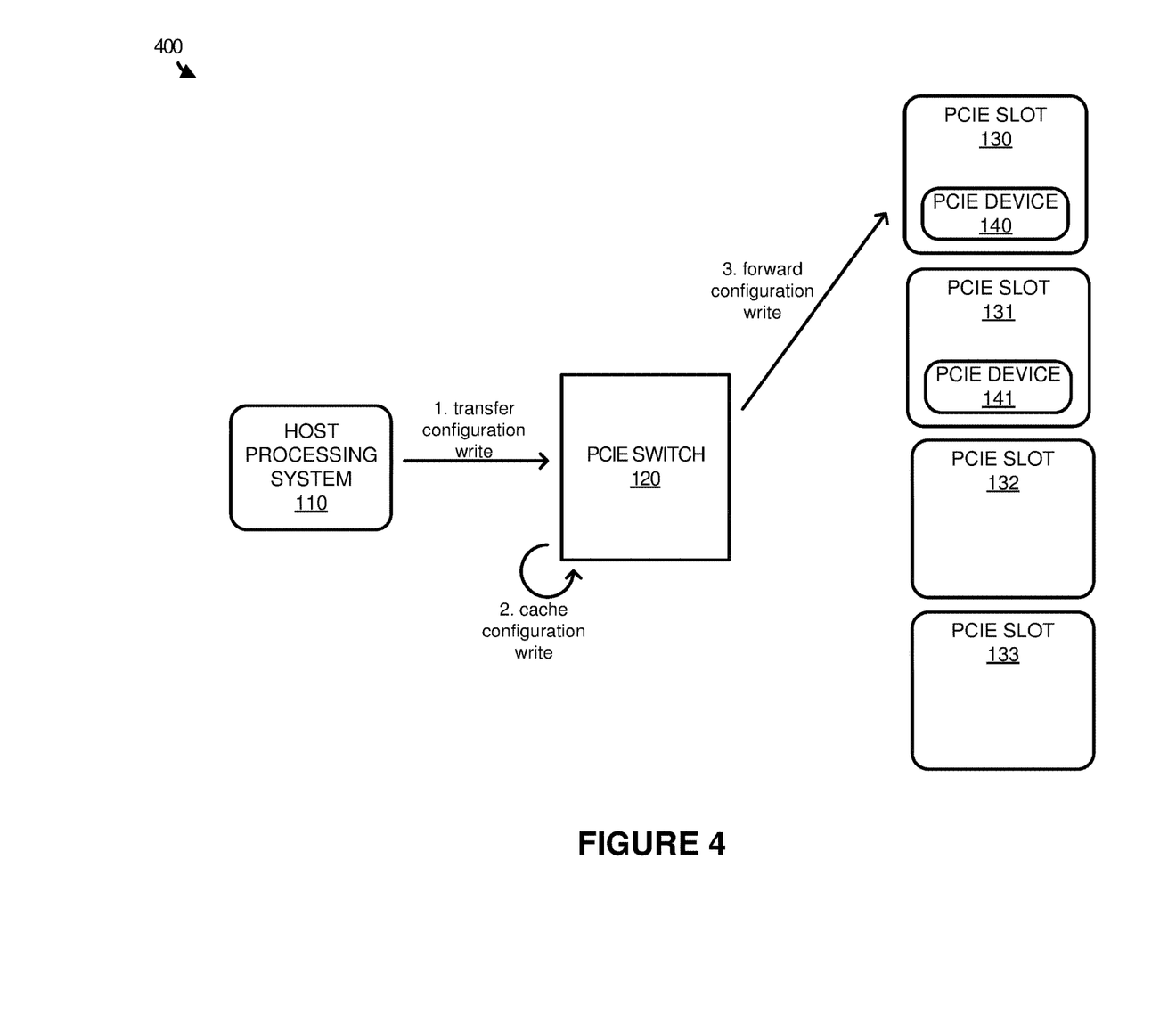
FIG. 4 illustrates an operational scenario of providing a configuration write to a PCIe device according to an implementation.

FIG. 4 illustrates an operational scenario 400 of providing a configuration write to a PCIe device according to an implementation. Operational scenario 400 includes systems and elements from computing system 100 of FIG. 1.

As described herein, when host processing system 110 is initiated, the host processing system may initiate enumeration processes to identify and configure PCIe devices available to host processing system 110. In response to attempts to identify the PCIe devices, rather than relying on the devices to provide device identifier information, PCIe switch 120 may provide the device identifier information to host processing system 110 for each PCIe slot even if a PCIe device is not currently installed in the slot. In response to identifying a PCIe device that is available to the host, host processing system 110 may be required to configure, or write configuration data, to the PCIe device to ensure that the device is capable of communicating with the host processing system.

Here, at step 1, host processing system 110 transfers a configuration write command directed at PCIe device 140 via PCIe switch 120. When the communication is received, at step 2, PCIe device 120 will cache the write, and forward the configuration write to PCIe device 140 at step 3. By caching the write information, PCIe switch 120 may be capable of maintaining a configuration for each of the PCIe slots. Thus, even if a PCIe device were removed, and replaced with the same or different device, PCIe switch 120 may maintain a record of the configuration and forward the communication to the PCIe device. For example, if PCIe device 140 were removed and replaced with a second device, wherein the second device comprised the same type of PCIe device (e.g. a data storage device), PCIe switch 120 may be used to configure the second device based on cached configuration writes received from host processing system 110. Once configured and a driver on host processing system 110 is notified that a device is now available via PCIe slot 130, applications and processes on host processing system 110 may communicate with the second PCIe device.

Figure 5:
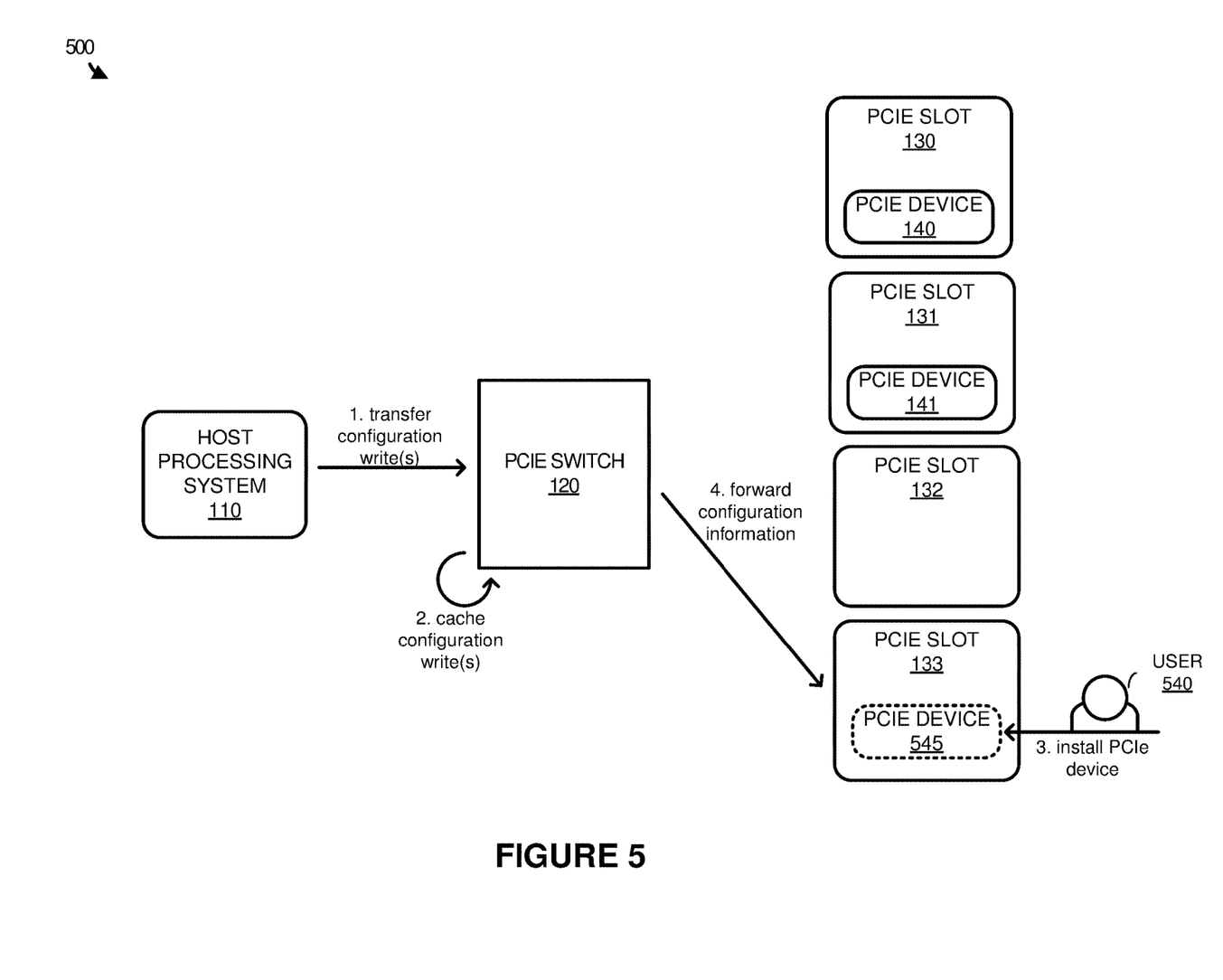
FIG. 5 illustrates an operational scenario of providing a configuration write to a PCIe device according to an implementation.

FIG. 5 illustrates an operational scenario 500 of providing a configuration write to a PCIe device according to an implementation. Operational scenario 500 includes systems and elements from computing systems 100 of FIG. 1, and is representative of a configuration write to a PCIe device that is not currently installed. Operational scenario 500 further includes user 540 and PCIe device 545, wherein user 540 is capable of adding or removing PCIe devices from the computing system.

Here, similar to the operations described in FIG. 4, when host processing system 110 is initiated, the host processing system may initiate enumeration processes to identify and configure PCIe devices available to host processing system 110. In response to attempts to identify the PCIe devices, rather than relying on the devices to provide device identifier information, PCIe switch 120 may provide the device identifier information to host processing system 110 for each PCIe slot even if a PCIe device is not currently installed in the slot. In response to identifying a PCIe device that is available to the host, host processing system 110 may be required to configure, or write configuration data, to the PCIe device to ensure that the device is capable of communicating with the host processing system. This configuration data may include memory addressing information, interrupt information, or some other similar configuration data that the PCIe device may use in communicating with the host processing system.

In the present implementation, host processing system 110 transfers, at step 1, a configuration write command directed at a PCIe device for PCIe slot 133 via PCIe switch 120. When PCIe switch 120 receives the one or more configuration writes, PCIe switch 120 caches, at step 2, the configuration writes locally at PCIe switch 120. This caching of the writes ensures that the configuration can be maintained for PCIe devices that will be installed in PCIe slot 132. For example, PCIe switch 120 may provide device identifier information to host processing system 110 indicating that the device for PCIe slot 133 is a particular type of data storage device. Consequently, although the device may not currently be installed in the PCIe slot, PCIe switch 120 may maintain configuration information for the device to ensure that the device can be configured when it is installed. This configuration information may include memory addressing to be used by the device, any interrupt information to be used by the device, or any other similar configuration information to be written to the PCIe device.

After the one or more configuration writes are cached by PCIe switch 120, user 540, at step 3, installs PCIe device 545, wherein PCIe device 545 is representative of an expected device for PCIe slot 133. Returning to the example of the data storage device, PCIe device 545 may comprise a data storage device that is of the type expected to be made available in the PCIe slot. As a result, once the installation of PCIe device 545 is identified by PCIe switch 120, PCIe switch 120 may forward, at step 4, configuration information based on the cached configuration writes to the PCIe device to make the PCIe device available to host processing system 110. As the configuration information is provided to the device, PCIe switch 120 may further provide a notification to host processing system 110 indicating that a device is now installed in the empty PCIe slot. This notification may be identified by the driver on the host to make PCIe device 545 available for operations by applications and processes of host processing system 110.

For example, if PCIe device 545 comprised a data storage device, prior to the installation of PCIe device in PCIe slot 133, the driver on host processing system 110 may indicate that the device is pending or not currently available to store data for applications and processes on host processing system 110. Once the device is installed, and the driver identifies the installation of the physical device, PCIe device 545 may be made available to applications and processes to store and read data.

Although illustrated in the previous example as installing a PCIe device of a type expected by PCIe switch 120, it should be understood that PCIe switch 120 may also be configured to identify when an improper PCIe device is installed. For example, if user 540 installed a graphics card in a PCIe slot that PCIe switch 120 expected a data storage device, PCIe switch 120 may identify that the device is improper and prevent the forwarding of configuration information to the PCIe device. Thus, although a device has been installed in a PCIe slot, the device may never be made available to host processing system 110, as the addressing and/or interrupt requirements for the installed device may be different than the requirements for the expected device.

Additionally, while not demonstrated in the present example, it should be understood that PCIe slots 130-133 may be configured to receive different types of devices. For example, PCIe slots 130-133 may be configured for three data storage devices of type A and a graphics card of type B. As a result, if PCIe devices 140-141 are used for data storage devices, then PCIe slots 132-133 may be used to support the third data storage device and the graphics card. Using this example, PCIe switch 120 may be configured such that the graphics card and data storage device may be installed in either PCIe slots 132-133. In particular, when the enumeration requests are received from host processing system 110, PCIe switch 120 may indicate that there are three data storage devices and a graphics card available. Because the graphics card is not installed, PCIe switch 120 may cache configuration information for the graphics card until it is made available via either of PCIe slots 132-133.

For example, if the graphics card were installed in PCIe slot 132, the PCIe switch 120 may provide a configuration for the PCIe device corresponding to configuration writes for the graphics card, and may further ensure that the host can communicate with or address the graphics card in PCIe slot 132. Similarly, if the graphics card were installed in PCIe slot 133, the PCIe switch 120 may provide a configuration for the PCIe device corresponding to configuration writes for the graphics card, and may further ensure that the host can communicate with or address the graphics card in PCIe slot 133. Thus, PCIe switch 120 may be used to coordinate and identify different types of devices as they are installed, and ensure that appropriate addressing configurations are available for communication between host processing system 110 and the end PCIe device.

Figure 6:
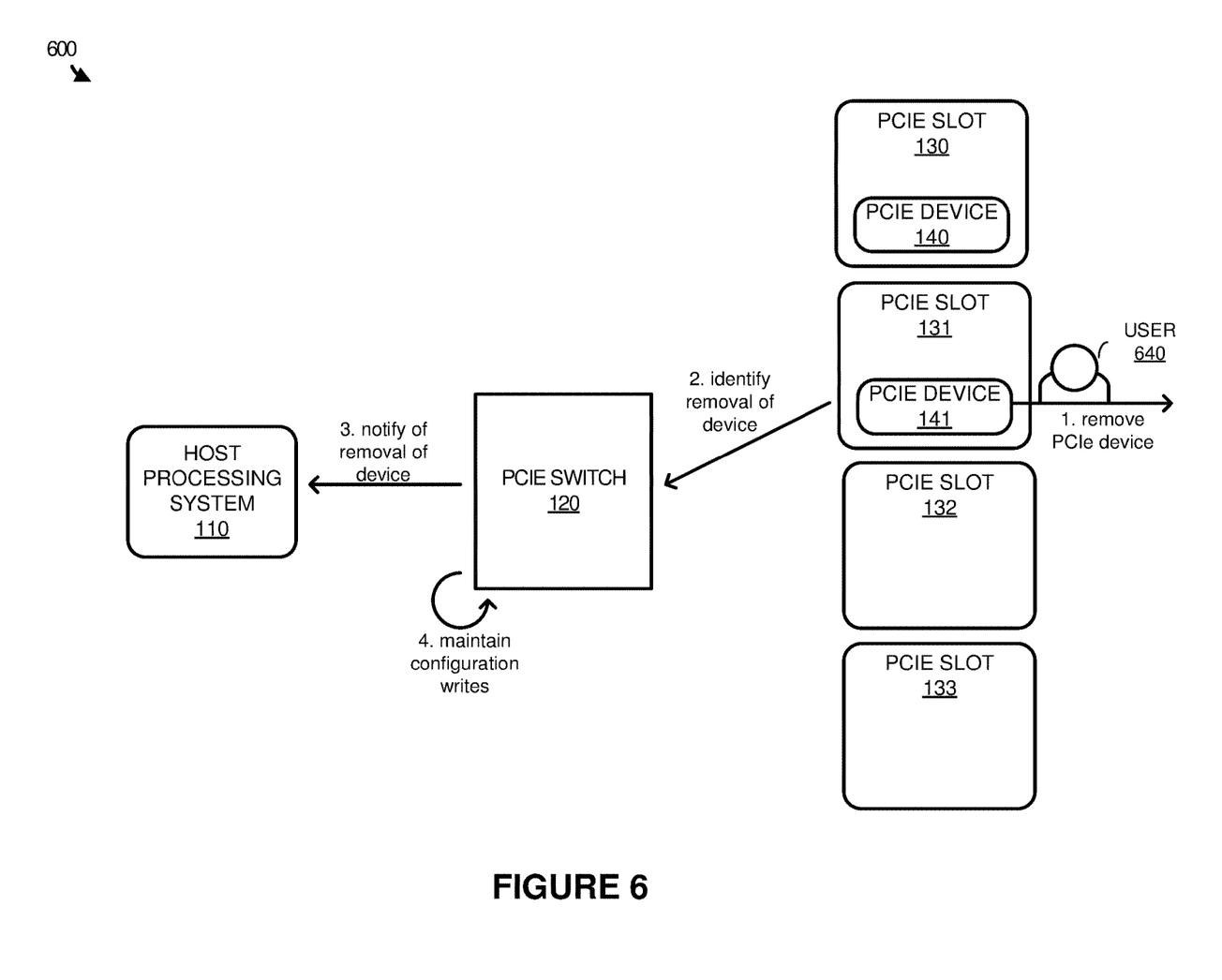
FIG. 6 illustrates an operational scenario of removing a PCIe device according to an implementation.

FIG. 6 illustrates an operational scenario 600 of removing a PCIe device according to an implementation. Operational scenario 600 includes systems and elements from computing system 100 of FIG. 1. Operational scenario 600 further includes user 640 capable of adding or removing devices while the host processing system is operating.

As depicted in operational scenario 600, host processing system 110 is initiated and is capable of communication with PCIe devices 140-141 via PCIe switch 120. To provide these communications, PCIe devices 140-141 may be provided with addressing configurations that permit each of the devices to communicate with the host. Here, after PCIe device 141 has been allocated a configuration to communicate with host processing system 110, user 640 may remove or "hot swap" PCIe device 141 from PCIe device slot 131, at step 1. Once the device is removed, PCIe switch 120 may identify, at step 2 that the device has been removed and notify, at step 3, host processing system 110 of the removal of the PCIe device. By providing the notification, PCIe switch 120 may ensure that applications and processes on host processing system 110 no longer communicate with the removed device.

However, although the device is removed, host processing system 110 may continue to provide configuration writes toward the removed PCIe device. Because of the configuration writes, PCIe switch 120 may be used to maintain, at step 4, the configuration write information such that when a new device is added or PCIe device 141 is replaced in PCIe slot 131, the device may be provided with configuration information from the configuration writes. This permits host processing system 110 to provide configuration information to a PCIe slot as though the PCIe device is installed, and PCIe switch 120 will ensure that the proper configuration is forwarded to the PCIe slot when a device is connected. Thus, if PCIe device 141 were replaced in PCIe slot 131, PCIe switch 120 may forward the required addressing configuration provided by host processing system 110.

Figure 7:
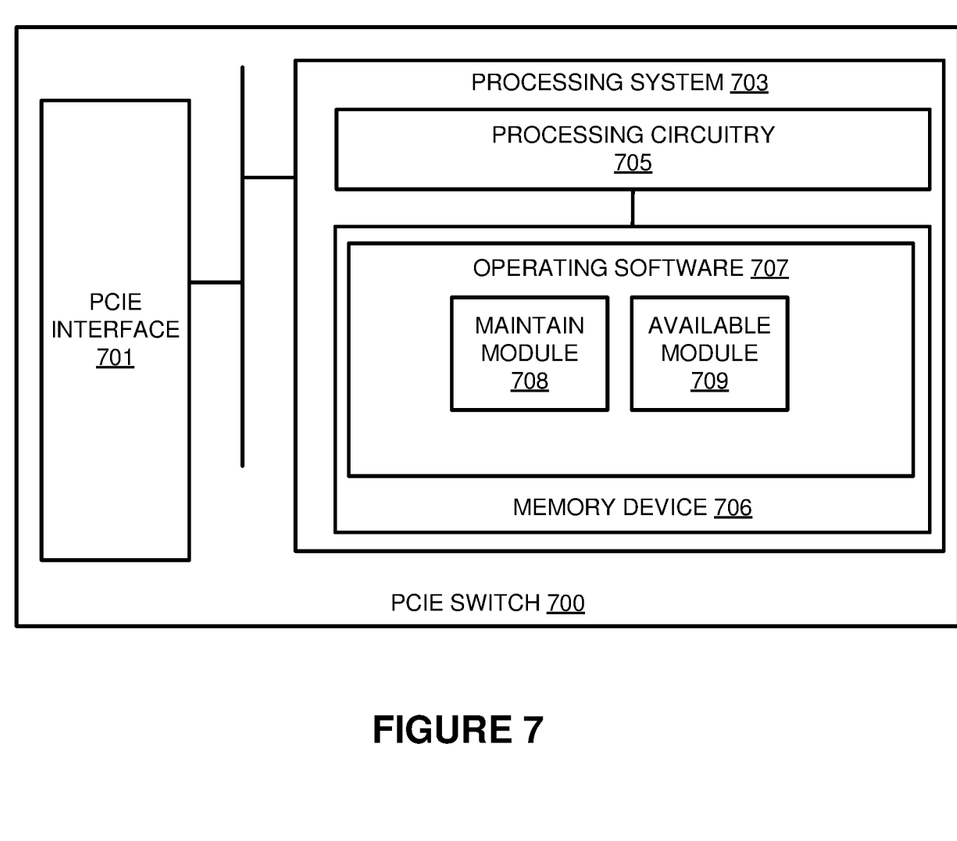
FIG. 7 illustrates a PCIe switch according to an implementation.

FIG. 7 illustrates a PCIe switch 700 according to an implementation. PCIe switch 700 is representative of any computing system or systems with which the various operational architectures, processes, scenarios, and sequences disclosed herein in FIGS. 1-6 for a PCIe switch can be implemented. PCIe switch 700 comprises PCIe interface 701 and processing system 703. Processing system 703 is operatively linked to PCIe interface 701. Processing system 703 includes processing circuitry 705 and memory device 706 that stores operating software 707. PCIe switch 700 may include other well-known components such as a battery and enclosure that are not shown for clarity.

PCIe interface 701 comprises components that communicate over PCIe lanes, such as ports, processing circuitry and software, or some other PCIe communication devices. PCIe interface 701 is configured to couple a host processing system, such as a CPU, to a plurality of PCIe slots, wherein the slots provide connectivity for PCIe devices. These PCIe devices may comprise data storage devices, such as Non-Volatile Memory express (NVMe) devices, graphics processing units, network interface cards, or some other similar PCIe device.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer-readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of PCIe interface 701 and user interface 702. Operating software 707 comprises computer programs, firmware, or some other form of machine-readable program instructions. Operating software 707 includes maintain module 708, and available module 709, although any number of software modules may provide similar operations. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, when a host processing system is initiated that is coupled to PCIe switch 700, the host processing system may transfer enumeration read requests to identify PCIe devices available to the host processing system. Here, rather than forwarding the requests to the PCIe devices, PCIe switch 700 is used to respond to the requests. In particular, maintain module 708, when read and executed by processing system 703, directs processing system 703 to receive the enumeration requests from the host processing system. In response to the requests, and for each available PCIe slot coupled to PCIe switch 700, maintain module 708 directs processing system 703 to provide the host processing system with device identifier information for PCIe devices associated with the PCIe slots even if one or more of the PCIe devices is not currently installed. This device identifier information may include a vendor for the PCIe device, a device identifier for the PCIe device, or some other similar information wherein the host processing system may use the information to verify and/or determine drivers for the particular device.

Once the device identifier information is provided to the host processing system, the host processing system may further be required to provide configuration writes to the PCIe devices to permit the devices to communicate with the host processing system. These configuration writes may include addressing and interrupt information allocated to the PCIe device to communicate with the host processing system. Here, maintain module 708 directs processing system 703 to identify configuration writes directed at a particular PCIe device (even if the PCIe device is not currently installed) and cache the configuration information from the writes locally at the PCIe switch. Further, if the PCIe device is currently installed, maintain module 708 may direct processing system 703 to forward the configuration communication to the corresponding PCIe device. In contrast, if the device is not installed, PCIe switch 700 may wait for the device to be installed, and once the device is installed may provide the required configuration information to make the PCIe device available to the host processing system.

In some implementations, such as that illustrated in FIG. 7, available module 709 may direct processing system 703 to provide availability information to the host processing system for each of the PCIe devices. For example, if PCIe switch 700 were coupled to three PCIe slots, but only two of the slots included an installed PCIe device, available module 709 may be responsible for notifying the host processing system of which devices are currently available. In particular, although the host processing system may allocate addressing resources for the PCIe devices, including the devices that are not currently installed, a driver for the host processing system may be used to ensure that any uninstalled devices are not made available to applications or processes executing on the host. In some implementations, the driver may be used to provide a "pending" status for each of the devices, such that the devices are not made available until the PCIe device is physically installed in a PCIe slot coupled to the switch. Once identified, a notification may be provided by the switch to the host processing system to make the PCIe device available to any application.

In some examples, PCIe switch 700 may be configured, such that multiple types of devices are expected to be coupled to the switch. For example, if PCIe switch 700 were communicatively coupled to four PCIe slots, PCIe switch 700 may be configured such that three of the slots may be used in conjunction with data storage devices, while the fourth slot may be used for a graphical processing unit. As a result, in response to enumeration requests to identify the devices, PCIe switch 700 may indicate device identifier information for the data storage devices and the graphical processing unit. As the configuration writes are received from the host processing system, such as configuration writes for the graphical processing unit, PCIe switch 700 may cache the writes to ensure that the graphical processing unit can be configured when installed. For example, if two of the data storage devices were installed in the first two PCIe slots, then the graphical processing unit may be se placed in either of the two remaining slots. Once installed, the PCIe switch may identify the installation and provide the required configuration information corresponding to the unit. Further, PCIe switch 700 may be used to ensure that communications to and from the host are routed to the proper PCIe device. Thus, while the PCIe switch may provide information about devices that can be installed in the future, the host is not required to identify the actual PCIe slot for the device. Rather, the PCIe switch may be responsible for identifying the slot for the device and providing the configuration such that the PCIe device and host can communicate.

Although demonstrated in the previous examples using PCIe interconnects, it should be understood that similar operations may be implemented using other interconnects, such as PCI, or some other interconnect that uses similar enumeration communications from a host to identify and configure end devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A Peripheral Component Interconnect Express (PCIe) switch configured to be communicatively coupled to a host processing system and to a plurality of PCIe slots, the PCIe switch comprising:
   one or more non-transitory computer-readable storage media;
   a processing system operatively coupled with the one or more computer-readable storage media; and
   program instructions stored on the one or more computer-readable storage media that, when read and executed by the processing system, direct the processing system to at least:
      receive at least one PCIe enumeration request from the host processing system to identify available PCIe devices,
      in response to the at least one PCIe enumeration request, transfer one or more responses to the host processing system indicating device identifier information for a plurality of PCIe devices corresponding to the plurality of PCIe slots, wherein:
         at least one PCIe device of the plurality of PCIe devices is not installed in an unoccupied PCIe slot of the plurality of PCIe slots, and
         the device identifier information includes device identifier information for the at least one PCIe device expected to be installed in the unoccupied PCIe slot, to enable the host processing system to allocate addressing resources for the at least one PCIe device that is not yet installed in the unoccupied PCIe slot.

2. The PCIe switch of claim 1, wherein the device identifier information comprises a vendor identifier and a device identifier for the at least one PCIe device.

3. The PCIe switch of claim 1, wherein the one or more responses further indicate whether the at least one PCIe device is currently installed in any PCIe slot of the plurality of PCIe slots.

4. The PCIe switch of claim 1, wherein the program instructions further direct the processing system to:
   receive a write command from the host processing system directed at a target PCIe device of the plurality of PCIe devices, wherein the write command provides configuration data for the target PCIe device;
   cache the write command;
   identify whether the target PCIe device is installed in a PCIe slot of the plurality of PCIe slots; and
   responsive to the target PCIe device being installed in a PCIe slot, forward the write command to the target PCIe device.

5. The PCIe switch of claim 4, wherein the program instructions further direct the processing system to:
   responsive to the target PCIe device not being installed in a PCIe slot, identify an installation of the target PCIe device in an available PCIe slot of the plurality of PCIe slots; and
   in response to the installation, forward the write command to the installed target PCIe device.

6. The PCIe switch of claim 4, wherein the write command comprises memory address allocation for the host processing system.

7. The PCIe switch of claim 1, wherein the plurality of PCIe devices comprises a data storage device.

8. The PCIe switch of claim 1, wherein the plurality of PCIe devices comprises a graphics processing unit.

9. A computing system comprising:
a plurality of Peripheral Component Interconnect Express (PCIe) slots; and
a PCIe switch communicatively coupled to the plurality of PCIe slots via PCIe lanes, the PCIe switch configured to:
receive at least one PCIe enumeration request from a host processing system to identify available PCIe devices;
in response to the at least one PCIe enumeration request, transfer one or more responses to the host processing system indicating device identifier information for a plurality of PCIe devices corresponding to the plurality of PCIe slots, wherein:
at least one PCIe device of the plurality of PCIe devices is not installed in an unoccupied PCIe slot of the plurality of PCIe slots, and
the device identifier information includes device identifier information for the at least one PCIe device expected to be installed in the unoccupied PCIe slot, to enable the host processing system to allocate addressing resources for the at least one PCIe device that is not yet installed in the unoccupied PCIe slot; and
in response to the at least one PCIe device being installed in the previously unoccupied PCIe slot, providing an indication to the host processing system that the at least one PCIe device has been made available.

10. The computing system of claim 9, wherein the device identifier information comprises a vendor identifier and a device identifier for the at least one PCIe device.

11. The computing system of claim 9, wherein the one or more responses further indicate whether the at least one PCIe device is currently installed in any PCIe slot of the plurality of PCIe slots.

12. The computing system of claim 9, wherein the PCIe switch is further configured to:
receive a write command from the host processing system directed at a target PCIe device of the plurality of PCIe devices, wherein the write command provides configuration data for the target PCIe device;
cache the write command;
identify whether the target PCIe device is installed in a PCIe slot of the plurality of PCIe slots; and
responsive to the target PCIe device being installed in a PCIe slot, forward the write command to the target PCIe device.

13. The computing system of claim 12, wherein the PCIe switch is further configured to:
responsive to the target PCIe device not being installed in a PCIe slot, identify an installation of the target PCIe device in an available PCIe slot of the plurality of PCIe slots; and
in response to the installation, forward the write command to the installed target PCIe device.

14. The computing system of claim 12, wherein the write command comprises memory address allocation for the host processing system.

15. The computing system of claim 9, wherein the plurality of PCIe devices comprises a data storage device.

16. The computing system of claim 9, wherein the plurality of PCIe devices comprises a graphics processing unit.

17. A computing system comprising:
a host processing system;
a plurality of Peripheral Component Interconnect Express (PCIe) slots; and
a PCIe switch communicatively coupled to the plurality of PCIe slots and to the host processing system via PCIe lanes, the PCIe switch configured to:
receive at least one PCIe enumeration request from the host processing system to identify available PCIe devices; and
in response to the at least one PCIe enumeration request, transfer one or more responses to the host processing system indicating device identifier information for a plurality of PCIe devices corresponding to the plurality of PCIe slots, wherein:
at least one PCIe device of the plurality of PCIe devices is not installed in an unoccupied PCIe slot of the plurality of PCIe slots, and
the device identifier information includes device identifier information for the at least one PCIe device expected to be installed in the unoccupied PCIe slot, to enable the host processing system to allocate addressing resources for the at least one PCIe device that is not yet installed in the unoccupied PCIe slot; and
the host processing system is configured to allocate addressing resources for the at least one PCIe device that is not yet installed in the unoccupied PCIe slot.

18. The computing system of claim 17, wherein the plurality of PCIe devices comprises a data storage device.

19. The computing system of claim 17, wherein the plurality of PCIe devices comprises a graphics processing unit.

20. The computing system of claim 17, wherein the PCIe switch is further configured to:
receive a write command from the host processing system directed at a target PCIe device of the plurality of PCIe devices, wherein the write command provides configuration data for the target PCIe device;
cache the write command;
identify whether the target PCIe device is installed in a PCIe slot of the plurality of PCIe slots; and
responsive to the target PCIe device being installed in a PCIe slot, forward the write command to the target PCIe device.

21. A Peripheral Component Interconnect Express (PCIe) switch configured to be communicatively coupled to a host processing system and to a plurality of PCIe slots, the PCIe switch comprising:
means for receiving at least one PCIe enumeration request from the host processing system to identify available PCIe devices; and
means for, in response to the at least one PCIe enumeration request, enabling the host processing system to allocate addressing resources for at least one PCIe device of the plurality of PCIe devices that is not yet installed in an unoccupied PCIe slot by transferring one or more responses to the host processing system indicating device identifier information for a plurality of PCIe devices corresponding to the plurality of PCIe slots, including device identifier information for the at least one PCIe device not installed in the unoccupied PCIe slot.

\* \* \* \* \*